(12) United States Patent
Mann et al.

(10) Patent No.: US 12,077,837 B2
(45) Date of Patent: Sep. 3, 2024

(54) HEAT-RESISTANT ALUMINUM POWDER MATERIAL

(71) Applicant: Obshchestvo S Ogranichennoy Otvetstvennost'yu "Obedinennaya Kompaniya Rusal Inzhenerno-Tekhnologicheskiy Tsentr", Krasnoyarsk (RU)

(72) Inventors: Viktor Khrist'yanovich Mann, Krasnoyarsk (RU); Aleksandr Yur'evich Krokhin, Krasnoyarsk (RU); Dmitrij Konstantinovich Ryabov, Krasnoyarsk (RU); Roman Olegovich Vakhromov, Krasnoyarsk (RU); Vladimir Aleksandrovich Korolev, Krasnoyarsk (RU); Ivan Yur'evich Mikhajlov, Krasnoyarsk (RU); Aleksandr Gareginovich Seferyan, Krasnoyarsk (RU)

(73) Assignee: OBSHCHESTVO S OGRANICHENNOY OTVETSTVENNOST'YU "OBEDINENNAYA KOMPANIYA RUSAL INZHENERNO-TEKHNOLOGICHESKIY TSENTR", Krasnoyarsk (RU)

( * ) Notice: Subject to any disclaimer, the term of this patent is extended or adjusted under 35 U.S.C. 154(b) by 0 days.

(21) Appl. No.: 17/850,730

(22) Filed: Jun. 27, 2022

(65) Prior Publication Data

US 2022/0325384 A1    Oct. 13, 2022

Related U.S. Application Data

(63) Continuation of application No. PCT/RU2020/050339, filed on Nov. 23, 2020.

(30) Foreign Application Priority Data

Dec. 27, 2019 (RU) .......................... RU2019144429

(51) Int. Cl.
*C22C 21/00* (2006.01)
*B22F 1/052* (2022.01)

(52) U.S. Cl.
CPC .............. *C22C 21/00* (2013.01); *B22F 1/052* (2022.01); *B22F 2301/052* (2013.01); *B22F 2304/10* (2013.01)

(58) Field of Classification Search
None
See application file for complete search history.

(56) References Cited

U.S. PATENT DOCUMENTS 3,989,548 A     11/1976  Morris
11,180,831 B2 * 11/2021  Mann ..................... C22F 1/053
(Continued)

FOREIGN PATENT DOCUMENTS

CN    108582920 A    9/2018
CN    109280820 A    1/2019
(Continued)

OTHER PUBLICATIONS

International Search Report and Written Opinion dated Mar. 15, 2021 in connection with International Application No. PCT/RU2020/050339, 13 pages.

(Continued)

*Primary Examiner* — Daniel J. Schleis
(74) *Attorney, Agent, or Firm* — Baker McKenzie LLP (57) ABSTRACT

The invention relates to the field of metallurgy, namely to new heat-resistant aluminum alloys used in additive technologies. The alloy includes nickel, manganese, iron, zirconium, cerium, at least one element selected from the group: copper, magnesium, zinc, and at least one element selected (Continued)

from the group: silicon, calcium, where Ni>Mn+Fe, one or more eutectic phases of the type of $Al_3Ni$, $Al_{16}Mn_3Ni$, $Al_9FeNi$, which are thermally stable, and dispersoids of the $Al_3Zr$ type, which ensure an ultimate strength of a resulting product of at least 370 MPa. The technical effect is the development of an aluminum material used in the form of a powder, which has good processability when printing and increased strength characteristics at room temperature after printing, without a significant decrease in strength after annealing.

1 Claim, 3 Drawing Sheets (56) References Cited

U.S. PATENT DOCUMENTS

2016/0258042 A1* 9/2016 Sanaty-Zadeh ...... C21D 9/0068
2021/0129270 A1* 5/2021 Dehoff .................. B33Y 70/10

FOREIGN PATENT DOCUMENTS

| CN | 110035848 A | 7/2019 |
|---|---|---|
| GB | 1479429 A | 7/1977 |
| JP | 53102210 A | 9/1978 |
| JP | 04107236 A | 4/1992 |
| RU | 2215055 C2 | 10/2003 |
| RU | 2673593 C1 | 11/2018 |
| WO | 2017077137 A2 | 5/2017 |
| WO | 2018119283 A1 | 6/2018 |
| WO | 2019155180 A1 | 8/2019 |

OTHER PUBLICATIONS

First Office Action dated Mar. 3, 2023 in connection with Chinese Application No. 202080084777.4, 4 pages.
Search Report dated Mar. 1, 2023 in connection with Chinese Application No. 202080084777.4, 3 pages.
Search Report dated Apr. 13, 2020 in connection with Russian patent application No. 2019144429, 2 pages.

* cited by examiner

HEAT-RESISTANT ALUMINUM POWDER MATERIAL

CROSS-REFERENCE TO RELATED APPLICATIONS

This application is a continuation of and claims priority to PCT application No. PCT/RU2020/050339 filed Nov. 23, 2020, which itself claims priority to Russian Patent Application No. 2019144429 filed Dec. 27, 2019 all of which are incorporated herein by reference in their entirety for all purposes.

TECHNICAL FIELD

The invention relates to the field of metallurgy, namely, to the material based on aluminum alloy and the powder made from it, to be used for the manufacture of parts with additive technologies.

Additive technologies, or technologies of layer-by-layer fusion, are currently an advanced field of digital manufacturing for 3D-printing. Several types of additive technologies are known, each of which is used for different production purposes. For example, these technologies are used to manufacture metal parts in aerospace engineering to create especially robust products. The main advantages are the speed and precision of manufacturing, saving of feedstock and low amount of waste.

Some additive technologies use metal powders as feedstock to manufacture various parts. At the same time, individual parts of some products of machine-building and engine-building industries become heated in the process of operation, which makes it necessary to use materials with increased heat resistance characteristics.

3D printing of aluminum powder is a layer-by-layer fused deposition of material upon itself combined with a high-rate cooling. This leads to the necessity of using materials, which have good casting characteristics, which are not prone to the formation of hot cracks, and which have a good ductility in the solid-liquid state.

The most widespread aluminum alloy that is used in additive technologies is AlSi10Mg in the form of powder, for example, see https://www.3dsystems.hu/content/pdf/3D-Systems_Laserform_AlSi10Mg(A)_DATASHEET_A4-us_2018.03.20_ WEB.pdf The alloy may contain 9-11% of silicon and 0.2-0.5% of magnesium.

The presence of silicon in the composition ensures good casting characteristics and the absence of hot cracks, which results in the formation of a high-quality structure during the printing process, while the addition of magnesium increases the strength. In such a case, the level of mechanical properties of the material after internal stress relief annealing does not exceed 320 MPa. The increase in the operating temperature considerably reduces the strength, which does not allow using this material for long periods of time at elevated temperatures.

There is a known aluminum alloy 2219 with an increased heat-resistance, for example, see, that comprises the following components (wt. %):

| | |
|---|---|
| Copper | 5.8 to 6.8 |
| Manganese | 0.2 to 0.4 |
| Zirconium | 0.1 to 0.25 |
| Iron | up to 0.3 |
| Silicon | up to 0.2 |
| Vanadium | 0.05 to 0.15 |
| Titanium | 0.02 to 0.1 |
| Zinc | up to 0.1 |
| Magnesium | up to 0.02 |
| Impurity elements | up to 0.15 |

The balance is aluminum.

The alloy has satisfactory casting properties and is weldable; its main alloying element is copper, which in the course of ageing forms $Al_2Cu$-type dispersoids, which are effective strengtheners.

Due to this, this alloy requires quenching and subsequent artificial ageing to ensure maximum performance. At the same time, the temperatures exceeding 250° C. considerably reduce the strength of the material due to coagulation of strengthening phases, which prevents its long-term use in structures at 250° C. temperature. Besides, this alloy may be used in printing with additive technologies, but it is prone to the formation of hot cracks during the printing; for example, see https://www.wlt.de/lim/Proceedings/Stick/PDF/Contribution146_final.pdf.

There is a known aluminum material with increased heat-resistance characteristics (patent JP3845035, Nov. 15, 2006), which is used as a powder with the particle size of 20 to 90 μm in conventional powder metallurgy applications, and which comprises components with the following mass fractions (wt. %):

| | |
|---|---|
| Silicon | 10 to 30 |
| Iron | 1 to 5 |
| Nickel | 2 to 8 |
| Copper | 0.2 to 5 |
| Magnesium | 0.2 to 5 |

At least one element from the group containing:

| | |
|---|---|
| Manganese | 0.1 to 2 |
| Zirconium | 0.2 to 2 |
| Chromium | 0.05 to 0.4 |

Where the Fe/Ni ratio is within 1:1.25 to 1:1.2.

The balance is aluminum.

This alloy, due to a large amount of transition metals like nickel, iron and manganese, forms intermetallic compounds with high thermal stability, and additional alloying with elements like zirconium and chromium enables an additional increase in strength by forming dispersoids during thermal treatment. At the same time, the high content of silicon in the material and the general over-alloying do not allow using this alloy for printing because of the high content of intermetallic phases that lead to a drastic decrease in ductility and cause the formation of cracks during printing due to high internal stresses.

There is a known aluminum alloy with good strength at high temperature, which contains 0.1 to 2.5 wt % of manganese and 5.5 to 7.0 wt % of nickel, the balance being aluminum and unavoidable impurity elements (JPH02295640, Dec. 6, 1990).

The alloy has good casting characteristics and high strength at elevated temperatures; however, it has low strength at room temperature due to the absence of small dispersoids that prevent the movement of dislocations during deformation.

There is a known aluminum casting alloy (WO 2010083245, Jul. 22, 2010) that has good casting characteristics and high decorative properties, which comprises the following components (wt. %):

| Nickel | 6.6 to 8.0 |
|---|---|
| Manganese | 0.5 to 3.5 |
| Iron/Silicon | 0 to 0.25 each |
| Copper/Zinc/Magnesium | 0 to 0.5 each |
| Titanium/Zirconium/Scandium | 0 to 0.2 each |
| Boron/Carbon may be added in the quantity not exceeding 0.1%. | |

The rest of the elements do not exceed 0.05%, and the total content of trace elements must not exceed 0.15%, the balance is aluminum.

Due to the presence of eutectic-forming elements (manganese and nickel) in its composition, the material has good casting characteristics and low tendency to hot cracks; also, these phases are thermally stable and are not prone to strong coagulation over time. The disadvantage of the alloy is its low strength due to a low concentration of elements that form dispersoids during the annealing (ageing) process, and its high specific gravity due to a large amount of heavy alloying elements, which reduces the specific characteristics of the finished parts.

There is a known aluminum alloy that has good casting characteristics and high operating temperature (WO 2015144387, Oct. 1, 2015), which comprises the following components (wt. %):

| Nickel | 1 to 6 |
|---|---|
| Manganese | 1 to 5 |
| Zirconium | 0.1 to 0.4 |
| Vanadium | 0.1 to 1 |
| Tungsten and/or molybdenum | 0.1 to 1.0 |
| Iron | Up to 2 (optional) |
| Titanium | Up to 1 (optional) |
| Magnesium | Up to 2 (optional) |
| Silicon | Up to 0.5 (optional) |
| Copper | Up to 0.5 (optional) |
| Zinc | Up to 0.5 (optional) |

Transition metals from the group: strontium, scandium, lanthanum, yttrium, hafnium, niobium, tantalum and/or chromium-up to 5% (optionally).

The remainder is aluminum and unavoidable impurity elements (the volume of impurity elements not exceeding 1%).

Due to the formation of a large number of eutectic phases, the material has good casting characteristics, and the introduction of metals from among tungsten, molybdenum and transition metals forms high strength at increased temperatures. However, a considerable disadvantage is an excessive amount of those elements, which leads to a loss of ductility, which will not allow printing of the material with a proper quality because of high internal stresses. Moreover, such elements as tungsten, molybdenum, scandium are quite expensive, which increases the cost of the finished product significantly.

The closest to the claimed solution is the invention according to the published application JPH04107236 (A) Apr. 8, 1992, C22C 21/00, which discloses a heat-resistant aluminum alloy comprising components with the following mass fractions (wt. %):

| Manganese | 1.5 to 2.5 |
|---|---|
| Nickel | 0.5 to 3.0 |
| Iron | 0.2 to 0.8 |
| Silicon | 0.2 to 0.8 |
| Copper | 0.4 to 1.0 |
| Magnesium | 0 to 0.3 |
| Boron | 0.0005 to 0.005 |
| Chromium | 0.05 to 0.25 |
| Zirconium | 0.05 to 0.25 |

The balance is aluminum.

The alloy is characterised by increased strength, high workability during casting or brazing, and has a low rate of strength degradation with increasing temperature. However, the low content of alloying materials does not ensure an increased strength due to the absence of a sufficient quantity of intermetallic phases of cast origin and dispersoids.

BRIEF DESCRIPTION OF THE INVENTION

The technical objective of this invention is the development of a new heat-resistant aluminum material to be used in the form of powder for manufacturing of parts using additive technologies, which has good processability when printed and has increased strength characteristics (ultimate tensile strength of no less than 350 MPa) at room temperature after printing, without any significant decrease in strength after annealing to relieve internal stresses. Also, the material must retain its performance properties at the temperature of up to 300-350° C.

The technical result is the solution of the set problem and the achievement of the indicated advantages.

To solve the set problem and achieve the indicated advantages, a new heat-resistant aluminum alloy with the following component content (wt. %) is proposed.

| Nickel | 2.5 to 5.5 |
|---|---|
| Manganese | 1.0 to 3.5 |
| Iron | 0.15 to 2.0 |
| Zirconium | 0.2 to 1.0 |
| Cerium | 0.05 to 0.4 |
| At least one element from the group comprising Copper, magnesium, zinc | 0.05 to 1.5 in total |
| And at least one element from the group comprising Silicon, calcium | 0.1 to 2.0 in total |
| Aluminum and unavoidable impurities | balance. |

In addition, it is of particular advantage to maintain the following ratio of the contents of nickel, manganese and iron in the alloy:

Ni>Mn+Fe

BRIEF DESCRIPTION OF THE DRAWINGS

The drawings show.

DETAILED DESCRIPTION OF THE INVENTION

The introduction of nickel and manganese into the alloy ensures a sufficient processability of the material during printing due to the formation of eutectic phases like Al₃Ni or Al₁₆Mn₃Ni at high manganese content. The high content of eutectic phases in the material ensures a sufficient fluidity and resistance to the formation of hot cracks during printing and rapid crystallisation. Also, the phases that form during the solidification have high thermal stability and retain the structure and strength of the material at elevated temperatures. At high cooling rates, the manganese also forms a supersaturated solid solution in the aluminum, which can decompose with a slight increase in strength. The introduction of iron leads to additional strengthening at elevated temperature due to the formation of many intermetallic phases. The nickel content has been increased to form a larger number of phases which, considering the high rates of solidification characteristic of additive technologies, are formed in a compact manner that enables the preservation of the ductility indicators with a simultaneous increase in the strength characteristics at an elevated temperature. The addition of zirconium in the specified amount is necessary to reduce the grain size due to the known modification effect; also, considering the variable solubility of zirconium in aluminum, during further heat treatment, dispersoids of the Al₃Zr type will be formed ensuring additional strengthening at the room temperature, which allows retaining the strength characteristics of the material in the process of annealing. Due to their high stability, these dispersoids retain their sizes at the working temperatures of up to 350° C. The upper limit of the range is associated with the fact that an additional increase in the concentration of zirconium raises the temperature of complete melting above 950° C., which will require extra costs for heating and overheating the melt before atomizing the powders.

The introduction of iron in the specified range ensures the presence of Al₉FeNi-type spherical particles in the structure, which do not deteriorate the ductility characteristics while ensuring a low rate of strength weakening with increasing temperature. Moreover, the iron does not worsen the hot-tearing characteristics of the material, which allows retaining sufficient processability during printing.

The condition for the ratio of the content of nickel, iron and manganese in the alloy must be Ni>Mn+Fe, which provides the most optimal combination of strength and ductility properties of the material for printing. When the content of manganese and iron is exceeded, the material has reduced values of the relative elongation and yield stress due to the formation of too many intermetallic phases based on iron and manganese, which do not ensure an effective strengthening.

Cerium is introduced to partially eliminate the negative effect of iron as cerium can dissolve in iron-containing phases or form a ternary phase with iron with a more favourable morphology, which in the process of printing is likely to form along the boundaries of the grains. Herein, the presence of cerium in the composition reduces the rate of phase coagulation, thus increasing the thermal stability of the structure.

The elements from the group of copper, magnesium and zinc dissolve well in the aluminum matrix at elevated temperature and room temperature and tend to form oversaturated solid solutions during quick solidification; in small concentrations, these elements ensure solid solution strengthening of the aluminum matrix. This effect persists regardless of the heating and thermal treatment of the material, and the content of the elements was chosen to not exceed too much the equilibrium concentration of the element in the aluminum at room temperature. The increased content of these elements leads to an extension of the crystallisation interval and to crack formation during the printing process.

The elements from the group of silicon and calcium form additional eutectic phases, which increases the processibility during printing; also, due to a low density, these elements reduce the density of the material, which leads to an increase in the specific strength properties.

The addition of boron has been excluded from the composition of the alloy, as at high temperatures of melt preparation boron reacts with zirconium forming hard-melting borides that reduce the concentration of zirconium in the solid solution. Moreover, these borides remain in a solid state at atomisation temperatures, which reduces the quality of the powders.

The addition of chromium has been also excluded, as the higher concentration of zirconium ensures a more efficient strengthening than chromium-based intermetallides or chromium-based intermetallic phases. Also, the increased content of zirconium excludes the necessity of an additional introduction of elements, such as molybdenum or tungsten, which, in contrast to zirconium, reduce the ductility properties of the material.

EXAMPLES OF EMBODIMENTS OF THE INVENTION

Example 1

The powders of aluminum alloys of various compositions in accordance with Table 1 were produced by gas atomisation technique.

The melt was prepared in a gas-heated furnace. For preparation, aluminum of grade A8 as per GOST 11069-2001, magnesium of grade MG90 as per GOST 804-93, copper of grade M1 as per GOST 859-2001, silicon of grade 4001 as per GOST 2169-69, Mn80F20 and Ni80F20 alloy tablets, and binary master alloys of the rest of the elements were used.

After the melt preparation and control of its chemical composition, the alloy was overheated to the temperature of at least 100° C. higher in relation to the equilibrium liquidus and then atomised in nitrogen with the addition of oxygen in an amount not exceeding 0.8% to ensure controlled oxidation.

Figure 1:
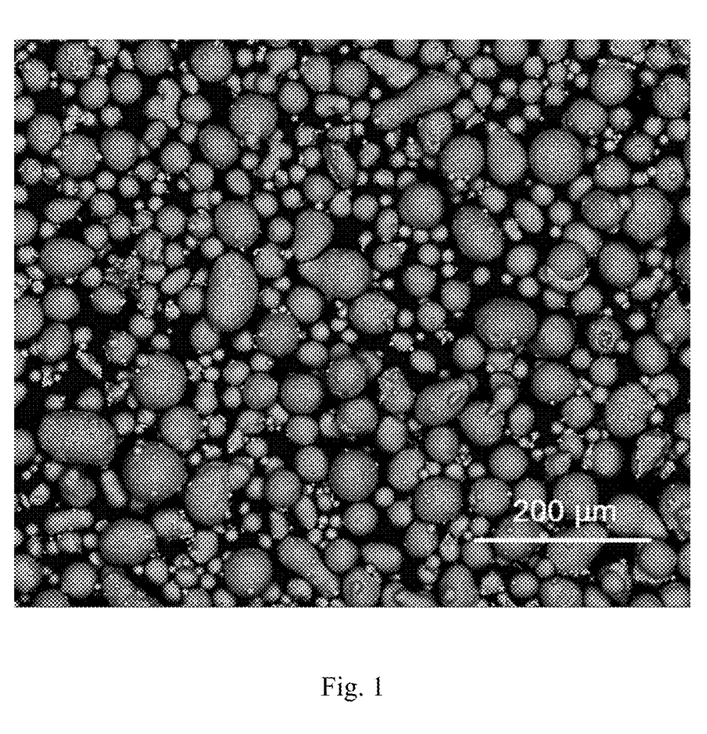
FIG. 1. Powder particles from the claimed alloy, produced by atomisation of the melt in the gas flow as per Example 1.

The resulting powders were screened to separate the fraction of D50=40±3 μm. The photographs of the powder taken with a scanning electron microscope (SEM) are shown in FIG. 1.

Selective laser melting of the powder was conducted in an argon environment using EOS M290 (https://www.eos.info/eos-m290). For the tests, cylinders were printed with the length of 80 mm and diameter of 12 mm, which were subsequently machined.

TABLE 1

| No | Al | Mn | Ni | Fe | Zr | Ce | Cu | Mg | Zn | Si | Ca | Cr | B |
|---|---|---|---|---|---|---|---|---|---|---|---|---|---|
| 1 | Base | 1.5 | 3.9 | 2.0 | 0.8 | 0.1 | — | 0.05 | — | 0.5 | 0.5 | — | — |
| 2 | | 2.0 | 5.0 | 1.5 | 1.0 | 0.05 | — | — | 1.5 | 1.2 | 0.4 | — | — |

TABLE 1-continued

| No | Al | Mn | Ni | Fe | Zr | Ce | Cu | Mg | Zn | Si | Ca | Cr | B |
|---|---|---|---|---|---|---|---|---|---|---|---|---|---|
| 3 | | 3.0 | 4.2 | 1.0 | 0.5 | 0.15 | — | 1.0 | 0.5 | 0.5 | — | — | — |
| 4 | | 3.5 | 5.5 | 0.15 | 0.6 | 0.28 | 0.05 | — | — | — | 0.1 | — | — |
| 5 | | 1.4 | 2.5 | 1.0 | 0.2 | 0.4 | 0.4 | 0.05 | — | — | 2.0 | — | — |
| 6 | | 1.0 | 4.0 | 0.5 | 0.5 | 0.2 | 0.1 | — | 0.1 | 0.1 | — | — | — |
| Prototype | | 2.1 | 2.1 | 0.5 | 0.12 | — | 0.8 | 0.03 | — | 0.4 | — | 0.12 | 0.001 |

The room-temperature tensile tests of the samples grown parallel to the building direction were conducted in accordance with the requirements of GOST 1497. Thermal treatment (annealing for internal stress relief) was conducted in the furnace with forced air circulation at temperatures between 250° C. and 300° C., which are typical for aluminum alloys.

The results of elongation tests after printing are shown in Table 2, and those after annealing are shown in Table 3.

TABLE 2

| No | Tensile strength, MPa | Yield strength, MPa | Elongation, % |
|---|---|---|---|
| 1 | 453 | 355 | 5.1 |
| 2 | 462 | 350 | 4.3 |
| 3 | 450 | 329 | 4.7 |
| 4 | 481 | 357 | 4.2 |
| 5 | 402 | 305 | 6.2 |
| 6 | 420 | 338 | 5.8 |
| Prototype | 368 | 246 | 6.5 |

TABLE 3

| | Annealing, 250° C./3 h | | | Annealing, 300° C./3 h | | |
|---|---|---|---|---|---|---|
| No | Tensile strength, MPa | Yield strength, MPa | Elongation, % | Tensile strength, MPa | Yield strength, MPa | Elongation, % |
| 1 | 450 | 341 | 5.8 | 456 | 350 | 5.9 |
| 2 | 458 | 346 | 4.6 | 463 | 352 | 5.1 |
| 3 | 448 | 321 | 5.1 | 459 | 332 | 5.8 |
| 4 | 479 | 350 | 4.1 | 477 | 367 | 4.7 |
| 5 | 397 | 300 | 7.4 | 410 | 309 | 8.0 |
| 6 | 421 | 308 | 5.9 | 432 | 314 | 6.1 |
| Prototype | 345 | 218 | 6.8 | 342 | 220 | 7.2 |

From comparing the tables, it is evident that in the specified ranges the proposed material has increased strength characteristics immediately after the printing, as well as a low tendency for strength degradation during annealing to relieve the internal stress.

Example 2

The powders from aluminum alloys that have a chemical composition shown in Table 4 were produced using the technology described in the previous example, with high purity argon used instead of the nitrogen. The main difference between the alloys is in the ratio of nickel, manganese, and iron.

TABLE 4

| No | Al | Mn | Ni | Fe | Ce | Zr | Cu | Mg | Si | Ca | $\Sigma Mn + Fe$ | $Ni/\Sigma Mn + Fe$ |
|---|---|---|---|---|---|---|---|---|---|---|---|---|
| A | Base | 2.6 | 3.2 | 0.5 | 0.12 | 0.3 | 0.10 | 0.05 | 0.11 | 0.15 | 3.1 | 1.03 |
| B | | 2.0 | 3.3 | 0.9 | 0.1 | 0.32 | 0.12 | 0.05 | 0.11 | 0.15 | 2.9 | 1.14 |
| C | | 3.5 | 4.9 | 1.0 | 0.11 | 0.35 | 0.12 | 0.05 | 0.11 | 0.15 | 4.5 | 1.09 |
| D | | 3.0 | 4.9 | 1.8 | 0.11 | 0.31 | 0.12 | 0.05 | 0.11 | 0.15 | 4.8 | 1.02 |
| E | | 2.4 | 3.2 | 1.2 | 0.12 | 0.34 | 0.12 | 0.05 | 0.11 | 0.15 | 3.6 | 0.89 |
| F | | 3.2 | 4.8 | 1.7 | 0.1 | 0.32 | 0.11 | 0.05 | 0.11 | 0.15 | 4.9 | 0.98 |

Figure 2:
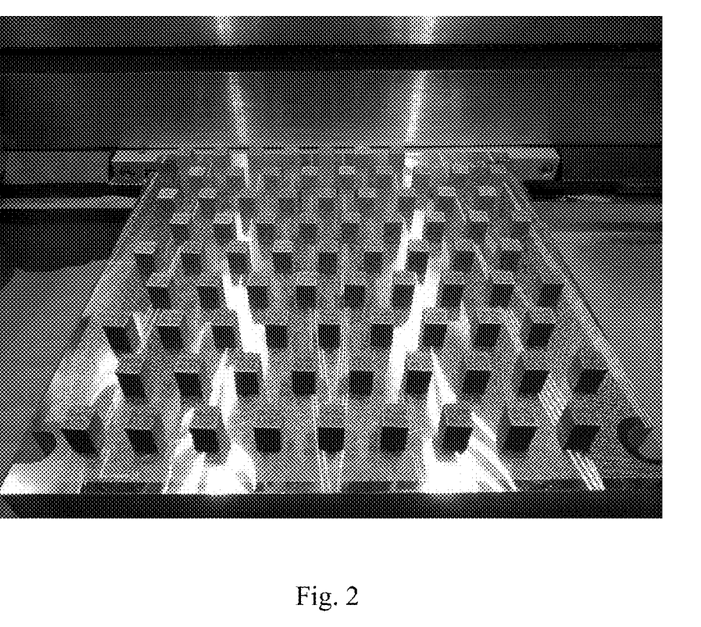
FIG. 2. Printed cubes on a platform.

EOS M290 3D printer was used for the selective laser melting process. To reduce the residual stresses after printing, annealing was carried out at 300° C. Cubes with the dimensions 10×10×10 mm³ were used as samples to determine the porosity (FIG. 2), and cylinders from which samples were cut out to perform tensile tests in accordance with the requirements of GOST 1497. The porosity was determined using microsections after they had been polished using a colloid mixture without chemical etching.

Figure 3:
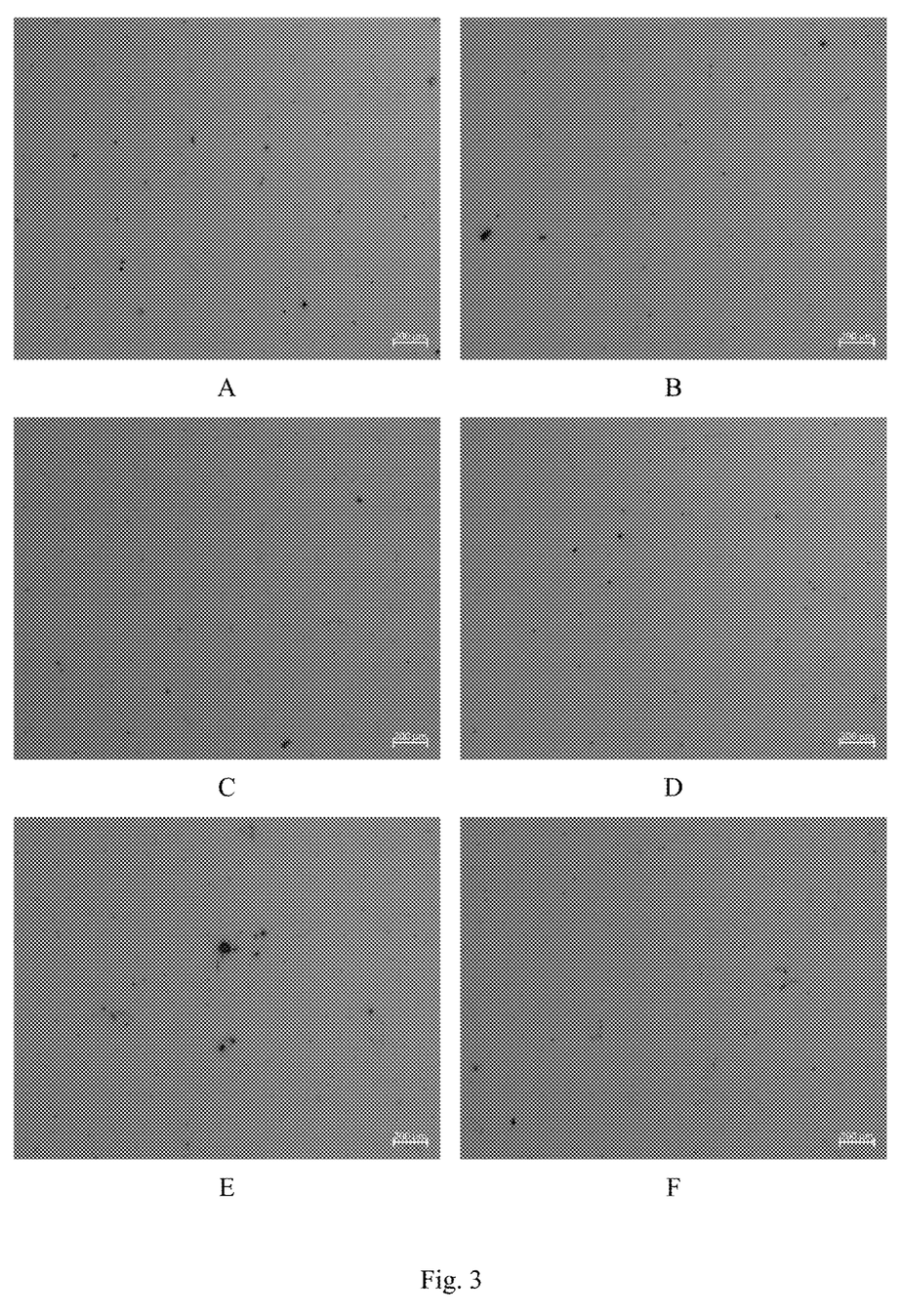
FIG. 3. Images of the material structure in an optical microscope (A, B, C, D, E, F).

Images of the structure are shown in FIG. 3. As can be seen from the images, regardless of the ratio, the porosity of the material is 0.09 to 0.21 vol. % without hot cracks in the structure.

Also, Table 5 shows the results of tensile tests at room temperature after annealing for each alloy.

TABLE 5

| No | Tensile strength, MPa | Yield strength, MPa | Elongation, % | Porosity vol. % |
|---|---|---|---|---|
| A | 448 | 334 | 6.1 | 0.14 |
| B | 439 | 320 | 5.7 | 0.13 |
| C | 461 | 337 | 5.0 | 0.16 |
| D | 469 | 349 | 5.2 | 0.09 |
| E | 447 | 312 | 4.1 | 0.21 |
| F | 473 | 316 | 3.7 | 0.16 |

From the analysis of Table 5, it follows that when the sum of the elements of manganese and iron is greater than the content of nickel, the material is characterised by 25-40% reduction of the indicators of relative elongation, which is indirect evidence of a reduced ductility of the material. A more brittle material performs worse in the conditions of alternating loads, which is undesirable for the performance of the printed product. Moreover, with an increase in iron and manganese content, the yield strength is reduced by 10%. These effects are explained by the changes in the ratio of phases in the material. An increase in the concentration of iron and manganese leads to the formation of additional phases, which, due to their quantity, reduce the ductility indicators. Also, phases with manganese and iron can bind small amounts of nickel, which leads to the formation of phases with a lower strengthening effect than a phase of the $Al_3Ni$ type.

In this regard, it would be of particular advantage to fulfil the condition that the nickel content must be higher than the sum of the iron and manganese content.

Example 3

The powder with chemical composition according to Table 6. The powder was produced by atomising at the temperature that was 80 degrees higher than the liquidus temperature in the environment of nitrogen with the addition of 0.3% of oxygen. The powder was screened to separate the fraction of +15\−63 μm.

TABLE 6

| Al | Mn | Ni | Fe | Ce | Zr | Cu | Mg | Zn | Si | Ca |
|---|---|---|---|---|---|---|---|---|---|---|
| Base | 1.9 | 3.6 | 0.7 | 0.2 | 0.28 | 0.3 | 0.2 | 0.1 | 0.3 | 0.2 |

EOS M290 3D printer was used for the selective laser melting process. The printing process was carried out in the argon environment, the speed of the laser beam scanning of the powder surface was 400 to 1200 mm/s with the laser power of 280 to 320 W. The maximum layer thickness was 45 μm. The products used were 24 cylinders with a diameter of 12 to 30 mm and a length of 80 mm. At the end of the printing process, the manufactured products were machined to obtain the geometry of the samples for the tensile test to comply with the requirements of GOST 1497 (for tests at room temperature) and GOST 9651 (for tests at elevated temperatures). Before the machining, the products had been annealed to relieve the internal stresses during printing related to higher (more than 1000 K/s) cooling rates after melting with the laser beam. The results of the tensile tests are shown in Table 7.

TABLE 7

| Test temperature, K | Tensile strength, MPa | Yield strength, MPa | Elongation, % |
|---|---|---|---|
| 298 | 442 | 325 | 5.3 |
| 373 | 397 | 308 | 7.3 |
| 473 | 345 | 292 | 10.0 |
| 523 | 308 | 266 | 12.5 |
| 623 | 212 | 131 | 15.2 |

From the results of the tests, it is evident that the proposed material has a low rate of strength degradation when heated, which is related to the presence of an optimal quantity of hard-melting thermally stable phases in its structure, as well as to good processability during printing, which allows printing products with a minimum number of defects in the form of pores and without hot cracks.

In accordance with the provided description and examples, the scope of legal protection is sought for the following subject matter:

Aluminum alloy powder containing nickel, manganese, iron, zirconium, characterised in that it additionally contains at least one element from the group: copper, magnesium, zinc, as well as at least one element from the group: silicon, calcium, with the following composition (wt. %):

| | |
|---|---|
| Nickel | 2.5 to 5.5 |
| Manganese | 1.0 to 3.5 |
| Iron | 0.15 to 2.0 |
| Zirconium | 0.2 to 1.0 |
| Cerium | 0.05 to 0.4 | at least one element from the group comprising:

| | |
|---|---|
| Copper, magnesium, zinc | 0.05 to 1.5 in total |
| And at least one element from the group comprising Silicon, calcium | 0.1 to 2.0 in total |
| Aluminum and unavoidable impurities | remainder, | wherein the content of nickel, manganese and iron in the alloy satisfies the condition Ni>Mn+Fe, which ensures the optimum combination of the strength and ductility properties of the material for printing.

The powder preferably has particle size distribution within 10 to 150 μm, the most preferably, within 10 to 63 μm. The powder can be produced by gas atomisation in the environment of nitrogen or argon and by gas atomisation in the environment of nitrogen or argon with an addition of oxygen in the amount of 0.1 to 0.8 wt %.

Also claimed is a method of manufacturing of products using the additive technologies characterised in that it uses the proposed aluminum powder material.

The claim also includes a product from aluminum alloy powder containing nickel, manganese, iron, zirconium, additionally containing at least one element from the group: copper, magnesium, zinc, as well as at least one element from the group: silicon, calcium, with the following composition (wt. %):

| | | |
|---|---|---|
| Nickel | 2.5 to 5.5 | |
| Manganese | 1.0 to 3.5 | |
| Iron | 0.15 to 2.0 | |
| Zirconium | 0.2 to 1.0 | |
| Cerium | 0.05 to 0.4 | | at least one element from the group comprising:

| | | |
|---|---|---|
| Copper, magnesium, zinc | 0.05 to 1.5 in total | |
| And at least one element from the group comprising | 0.1 to 2.0 in total | |
| Silicon, calcium | | |
| Aluminum and unavoidable impurities | balance, | | wherein the content of nickel, manganese and iron in the alloy satisfies the condition Ni>Mn+Fe, which ensures the optimum combination of the strength and ductility properties of the material for printing.

It is reasonable that the indicated product from aluminum powder alloy is manufactured at solidification rate of no less than 1000 K/s, and has the ultimate tensile strength of at least 370 MPa at room temperature after printing or stress relief annealing.

The invention claimed is:

1. An aluminum alloy powder for manufacturing products using additive technologies, the aluminum alloy powder containing nickel, manganese, iron, zirconium, and cerium, the aluminum alloy powder comprising:

at least one element selected from the group: copper and zinc, and at least one element selected from the group: silicon and calcium, wherein the aluminum alloy powder composition comprises in wt. %:

| | | |
|---|---|---|
| nickel | 2.5 to 5.5 | |
| manganese | 1.0 to 3.5 | |
| iron | 0.15 to 2.0 | |
| zirconium | 0.2 to 1.0 | |
| cerium | 0.05 to 0.4 | | at least one element selected from the group comprising:

| | | |
|---|---|---|
| copper and zinc | 0.05 to 1.5 in total | |
| and at least one element selected from the group comprising: | | |
| silicon and calcium | 0.1 to 2.0 in total | |
| aluminum and impurities | remainder, | | wherein:
the content of nickel, manganese, and iron meet the condition Ni>Mn+Fe in the composition,
the aluminum alloy powder according to the composition contains an eutectic phase including $Al_{16}Mn_3Ni$ or $Al_9FeNi$, or a combination of both $Al_{16}Mn_3Ni$ and $Al_9FeNi$, which are thermally stable, and
the aluminum alloy powder further comprises dispersoids of an $Al_3Zr$ type, the dispersoids enabling a tensile strength of at least 370 MPa in a resulting product generated using the aluminum alloy powder after printing or annealing to relieve internal stresses of the resulting product.

* * * * *